United States Patent
Sato et al.

(10) Patent No.: US 9,895,960 B2
(45) Date of Patent: Feb. 20, 2018

(54) FRONT DEFROSTER NOZZLE APPARATUS

(71) Applicants: TOYODA GOSEI CO., LTD., Kiyosu-shi, Aichi-ken (JP); TOYOTA JIDOSHA KABUSHIKI KAISHA, Toyota-shi, Aichi-ken (JP)

(72) Inventors: Asei Sato, Kiyosu (JP); Minoru Shibata, Kiyosu (JP); Kouta Kajikawa, Toyota (JP); Hidenori Uno, Toyota (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 225 days.

(21) Appl. No.: 14/880,409

(22) Filed: Oct. 12, 2015

(65) Prior Publication Data

US 2016/0107612 A1    Apr. 21, 2016

(30) Foreign Application Priority Data

Oct. 17, 2014 (JP) .................................. 2014-212782

(51) Int. Cl.
*B60S 1/54* (2006.01)
*B60H 1/34* (2006.01)
*B60H 1/24* (2006.01)

(52) U.S. Cl.
CPC ........... *B60H 1/3407* (2013.01); *B60H 1/242* (2013.01)

(58) Field of Classification Search
CPC .. B60H 1/00564; B60H 1/00871; B60H 1/34; B60H 1/3407

USPC ................................. 454/126, 121, 124, 127
See application file for complete search history.

(56) References Cited

U.S. PATENT DOCUMENTS

| | | | |
|---|---|---|---|
| 5,980,379 A | 11/1999 | Shibata et al. | |
| 2007/0006999 A1 | 1/2007 | Lee | |
| 2007/0293134 A1* | 12/2007 | Shimada | B60H 1/3407 454/121 |

FOREIGN PATENT DOCUMENTS

| | | |
|---|---|---|
| JP | H10-203157 A | 8/1998 |
| JP | H10-236153 A | 9/1998 |
| JP | H11-034652 A | 2/1999 |
| JP | 2000-233721 A | 8/2000 |
| JP | 2003-276430 A | 9/2003 |
| JP | 2005-153818 A | 6/2005 |
| JP | 2009-280057 A | 12/2009 |

* cited by examiner

Primary Examiner — Vivek Shirsat
(74) Attorney, Agent, or Firm — Posz Law Group, PLC

(57) ABSTRACT

A front defroster nozzle apparatus includes a retainer, and a guide fin. The retainer includes an inlet opening, an outlet port, and a retainer base. The retainer base is branched into two forked elements (i.e., first and second branches having a first outlet opening and a first inlet end and a second outlet opening and a second inlet end, respectively). The outlet port involving the first and second outlet openings has an outlet width of 400 mm or less that is larger than an opening width of the inlet opening. The first and second outlet openings have first and second opening widths being larger than first and second opening widths of the first and second inlet ends. The retainer base includes a throttled portion whose flow-passage cross-sectional area accounts for from 80% or less to 60% or more of a flow-passage cross-sectional area of the inlet opening.

5 Claims, 6 Drawing Sheets

FRONT DEFROSTER NOZZLE APPARATUS

INCORPORATION BY REFERENCE

The present invention is based on Japanese Patent Application No. 2014-212782, filed on Oct. 17, 2014, the entire contents of which are incorporated herein by reference.

BACKGROUND OF THE INVENTION

Field of the Invention

The present invention relates to a front defroster nozzle apparatus for removing fogs on a windshield of automobile which result from frosts and dew condensations on the windshield. In particular, it relates to a front defroster nozzle apparatus excelling in the defogging performance, although the present front nozzle defroster nozzle apparatus has a compact configuration.

Description of the Related Art

For examples, Japanese Unexamined Patent Publication Gazette No. 2003-276430 discloses, as one of the component parts of an automotive air-conditioning system, a conventional front defroster nozzle apparatus that has been used widely so far. The conventional front defroster nozzle apparatus is installed to a vehicular interior part, such as an instrument panel, so as to open under the windshield at one of the opposite ends. Moreover, the conventional front defroster nozzle apparatus is connected with an air-conditioning system for vehicle at the other one of the opposite ends, thereby supplying air-conditioning airs, which the vehicular air-conditioning system blows out, to the windshield. In addition, the air-conditioning airs heat the windshield to remove water droplets adhering on the windshield. Thus, the conventional front defroster nozzle apparatus removes fogs on the windshield. Such a conventional front defroster nozzle apparatus comprises two openings. One of the openings makes a blow-out or outlet port facing to the windshield. The other one of the openings is connected with the above-described vehicular air-conditioning system directly or indirectly. For the convenience of supplying air-conditioning airs to the windshield, it has been often the case that the outlet port usually has a long and narrow configuration extending in a vehicular width direction along the lower end of the windshield.

Incidentally, in the conventional front defroster nozzle apparatus, the outlet port has been disposed over the entire length of the windshield substantially in a vehicular width direction. The disposition is intended to remove each and every bit of fogs on the windshield over the entire face of the windshield without exception.

However, in recent years, it has become difficult to dispose the outlet port of a front defroster nozzle apparatus over the entire length of a windshield substantially in a vehicular width direction. For example, such a technological proposal as disposing a head-up display device in a vehicle has been made recently. The head-up display device is a device for projecting the information on traveling, like vehicular speeds, onto a windshield. In consideration of the relationship of the light-path length of a head-up display to a windshield, it is considered good to put the head-up display device in place adjacent to the windshield. When a vehicle has such a head-up display device onboard, a region, which enables the outlet port of a front nozzle apparatus in the vicinity of the windshield to be put in place, has been narrowed down. As a result, it has become difficult to dispose the outlet port of a front defroster nozzle apparatus over the entire length of the windshield in a vehicular width direction. Consequently, in such a front defroster nozzle apparatus, it has been required to make the vehicular-width-direction outlet width of the outlet port smaller. Note that, in the present specification, the terms, a "blow-out or outlet width in a vehicular width direction" and a "vehicular-width-direction blow-out or outlet width," might sometimes be simply abbreviated to as a "blow-out or outlet width," if needed.

However, simply making a blow out or outlet width of the outlet port smaller has been associated with such a problem that it becomes difficult to supply air-conditioning airs onto the entire face of a windshield, because the smaller outlet width makes a flow-passage cross-sectional area smaller for air-conditioning airs blown out from a front defroster nozzle apparatus.

SUMMARY OF THE INVENTION

The present invention has been developed in view of the aforementioned circumstances. It is therefore an object of the present invention to provide a front defroster nozzle apparatus whose blow-out or outlet port has a small blow-out or outlet width, and which enables air-conditioning airs to be supplied onto a windshield over a wide range thereof as much as possible.

For example, a front defroster nozzle apparatus according to the present invention is a front nozzle defroster apparatus comprising:

a cylindrical retainer including an inlet opening being connectable with an air-conditioning system, and a blow-out or outlet port opened under a windshield within a vehicular passenger room; and a guide fin disposed inside the retainer;

the retainer further including a retainer base involving the inlet opening, a first branch, and a second branch, the first and second branches being continuous from a downstream side of the retainer base, and branched from the retainer base into two forked elements;

the first branch including a first inlet end being continuous from the retainer base, and a first blow-out or outlet opening making a part of the outlet port;

the second branch including a second inlet end being continuous from the retainer base, and a second blow-out or outlet opening making another part of the outlet port;

the outlet port involving the first and second outlet openings to have a blow-out or outlet width of 400 mm or less;

the outlet width of the outlet port being larger than an opening width that the inlet opening has;

the first outlet opening having a first opening width being larger than a first flow-passage width that the first inlet end has;

the second outlet opening having a second opening width being larger than a second flow-passage width that the second inlet end has;

the retainer base including a throttled portion whose flow-passage cross-sectional area is smaller than a flow-passage cross-sectional area that the inlet opening has; and the flow-passage cross-sectional area of the throttled portion falling in a range of from 80% or less to 60% or more of the flow-passage cross-sectional area of the inlet opening.

The thus constructed front defroster nozzle apparatus according to the present invention can supply air-conditioning airs onto a windshield over the entire face substantially, although it has such a very small blow-out or outlet width as 400 mm or less at the outlet port involving the first and second outlet openings.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

A front defroster nozzle according to the present invention will be hereinafter described while giving specific embodiments thereof. Note that, unless otherwise specified, numerical ranges, namely, "from 'x' to 'y'" set forth in the present specification, involve the lower limit, "x," and the upper limit, "y" in the ranges. Moreover, the other numerical ranges are composable by arbitrarily combining any two of the upper-limit values and lower-limit values, involving the other numeric values enumerated in a specific embodiment as well. In addition, selecting numeric values arbitrarily from within the ranges of numeric values enables other upper-limit and lower-limit numerical values to be set.

Reference Embodiment

Figure 10:
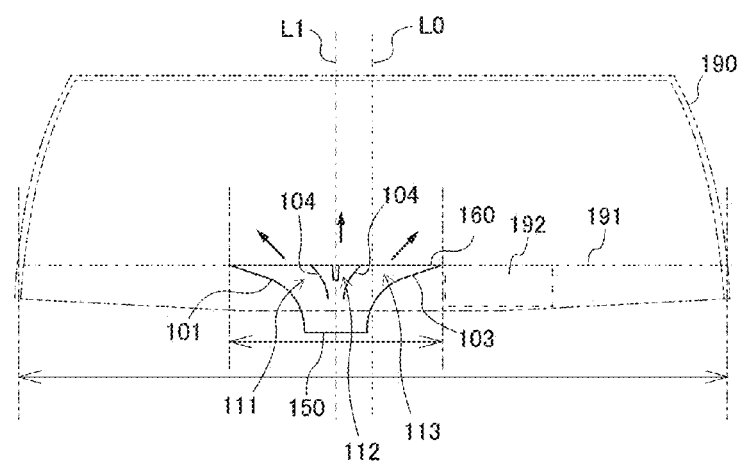
FIG. 10 is an explanatory diagram for schematically illustrating an appearance of a front defroster nozzle apparatus according to Tryout or Reference Embodiment when it is put in place within a vehicular passenger room.

In order to make a front defroster nozzle apparatus according to the present invention distinct, a front nozzle defroster apparatus according to Tryout or Reference Embodiment, which does not read on the claimed present front defroster nozzle apparatus, will be hereinafter presented. FIG. 10 illustrates an explanatory diagram for schematically showing an appearance of the front defroster nozzle apparatus according to Reference Embodiment when it is viewed from within a vehicular passenger room. Note that the term, "vehicular width direction," indicates hereinafter the navigator-seat side/driver-seat side direction shown in FIG. 10, and the other term, "up/down direction," indicates up and down directions perpendicular to the navigator-seat side/driver-seat side direction shown in the drawing.

As illustrated in FIG. 10, the front defroster nozzle apparatus 101 according to Reference Embodiment comprises a retainer 103. The retainer 103 includes a blow-out or outlet port 160 and an inlet opening 150, and is formed as a cylindrical or duct-like shape. The retainer 103 is connected with a not-shown air-conditioning system at the inlet opening 150. Although not illustrated in FIG. 10, the retainer 103 is formed as a substantially rectangular shape, whose longitudinal direction is directed in the vehicular width direction, at the outlet port 160. The retainer 103 is formed as a substantially sector shape whose opening width enlarges from the inlet opening 150 to the outlet port 160. The outlet port 160, and the inlet opening 150 are joined with each other by side walls that curve gently.

As illustrated in FIG. 10, two guide fins (104, 104) are disposed inside the retainer 103. The guide fins (104, 104) are arranged in the vehicular width direction, namely, in the outlet-width direction of the outlet port 160, thereby dividing an area into three regions in the vehicular width direction on the side of the outlet port 160 in the interior of the retainer 103. The thus divided three regions will be hereinafter referred to as a first region 111, a second region 112 and a third region 113, from the navigator-seat side to the driver-seat side. Air-conditioning airs, which are introduced into the retainer 103 by way of the inlet opening 150, flow into one of the first region 111, second region 112 and third region 113. The air-conditioning airs, which have flow into the first region 111, are supplied to the navigator-side region of a windshield 190 while guided by one of the side walls of the retainer 103 and the navigator-seat side guide fin 104 to expand in the vehicular width direction. Moreover, the air-conditioning airs, which have flow into the third region 113, are supplied to the driver-seat-side region of the windshield 190 while guided by the other one of side walls of the retainer 103 and the driver-seat side guide fin 104 to expand in the vehicular width direction. In addition, the air-conditioning airs, which have flow into the second region 112, are supplied to a region locating in the substantially middle of the windshield 190 while guided by the two guide fins (104, 104) to expand in the vehicular width direction. The air-conditioning airs warm up the windshield 190. As a result, fogs on the windshield 190 are removed.

Incidentally, a head-up display device 192 is commonly disposed on a driver-seat side under the windshield 190, as shown in FIG. 10. More specifically, an instrument panel 191 (depicted with a chain double-dashed line in FIG. 10) is disposed below the windshield 190, and is provided with the head-up display device 192 buried therein.

Therefore, it is not possible to dispose the front nozzle defroster apparatus 101 in the region where the head-up display device 192 is disposed within the instrument panel 191. That is, under the circumstance, the front defroster nozzle apparatus 101 is put in place lopsidedly on the navigator-seat side. In other words, the front defroster nozzle apparatus 101 is needed to be set on the navigator-seat side off from the region where the head-up display device 192 is buried. Moreover, setting the front defroster nozzle apparatus 101 on the navigator-side seat off from the region inevitably results in narrowing down the outlet width of the outlet port 160. For reference, in the front defroster nozzle apparatus 101 to be provided onboard for a vehicle in which no considerations are made on disposing the head-up display device 192, and the like, it is possible to ensure 600 mm or more for the outlet width of the outlet port 160, whereas the outlet width of the outlet port 160 is about 450 mm in the front defroster nozzle apparatus 101 according to Reference Embodiment.

Figure 11:
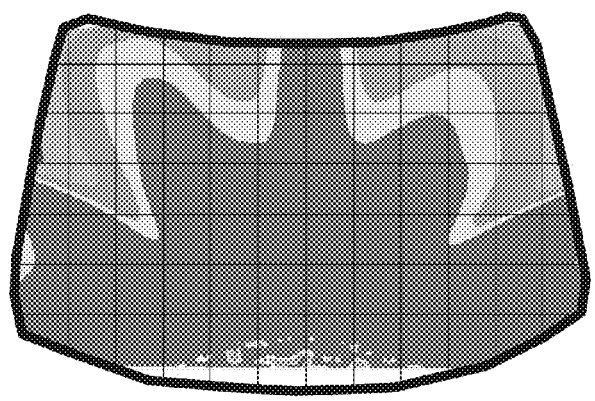
FIG. 11 is a diagram of the distribution of wind speeds on a windshield when air-conditioning airs were blown out from the front defroster nozzle apparatus according to Reference Embodiment.

When the outlet port 160 thus has a small outlet width, it becomes difficult to supply air-conditioning airs onto the entire windshield 190. Accordingly, it becomes less likely to efficiently remove fogs on the windshield 190. A computational fluid-dynamics (or CFD) analysis was done on the distribution of wind speeds on the windshield 190, namely, how winds flowed on the windshield 190 was simulated, when the front defroster nozzle apparatus 101 with the outlet port 160 having such a small outlet width was used. FIG. 11 shows results of the CFD analysis. The wind speeds were great sufficiently in the regions represented in the dark-gray color in FIG. 11, but the wind speeds were insufficient in the regions represented in the light-gray or white color in the drawing. Specifically, as shown in FIG. 11, wind speeds were insufficient in the regions on the navigator-seat and driver-seat sides, although sufficient wind speeds were obtained in the middle of the windshield 190. Since air volumes became insufficient in the regions where the wind speeds were insufficient, it is possible to maintain that it is extremely difficult for the front defroster nozzle apparatus 101 according to Reference Embodiment illustrated in FIG. 10 to supply air-conditioning airs over the entire face of the windshield 190. Note that, in the CFD analysis, the vehicle-width-direction center line "L0" of the windshield 190 and the vehicle-width-direction center line "L1" of the outlet port 160 were made to coincide with each other to obtain the results shown in FIG. 11.

Besides, it is necessary to supply air-conditioning airs in a sufficient air volume over a wide range of the windshield 190 as much as possible in order to remove fogs on the windshield 190 over a wide range as much as possible. In order to do so, it is believed satisfactory to superimpose the vehicle-width-direction center line "L1" of the outlet port 160 on the vehicle-width-direction center line "L0" of the windshield 190. However, when the front defroster nozzle apparatus 101 is put in place lopsidedly on the navigator-seat side as described above, the vehicle-width-direction center line "L1" of the outlet port 160 has also been put in place lopsidedly with respect to the vehicle-width-direction center line "L0" of the windshield 190, as shown in FIG. 10. Thus, it becomes much more difficult for the front defroster nozzle apparatus 101 according to Reference Embodiment illustrated in FIG. 10 to supply air-conditioning airs over the entire face of the windshield 190. An engineering technique for solving the problem will be hereinafter described as one of embodiments according to the present invention.

Embodiment

Figure 1:
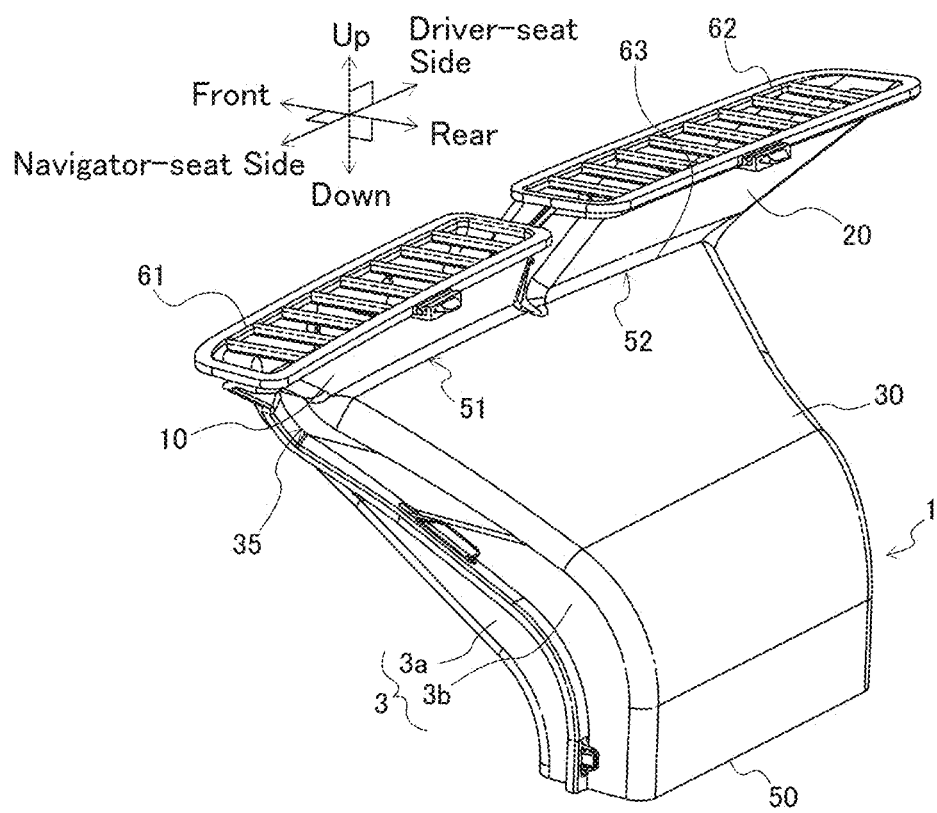
FIG. 1 is a perspective view for schematically illustrating a front nozzle defroster apparatus according to Embodiment of the present invention.
Figure 2:
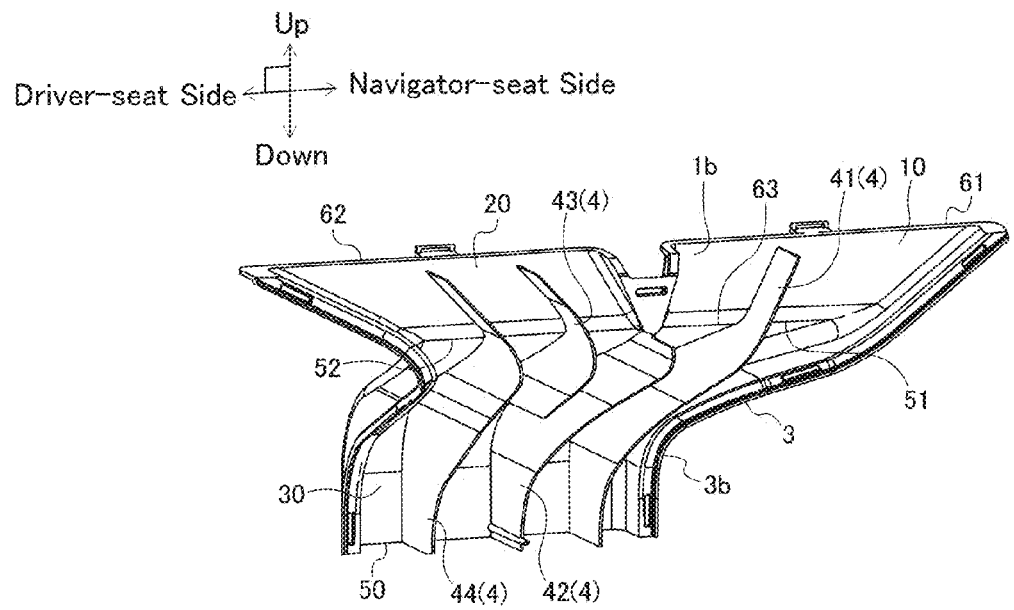
FIG. 2 is an exploded perspective view for schematically illustrating an appearance of a rear retainer, one of the component parts of the present front defroster nozzle apparatus according to Embodiment, when it is viewed from the leading end in a vehicular advancement direction.
Figure 3:
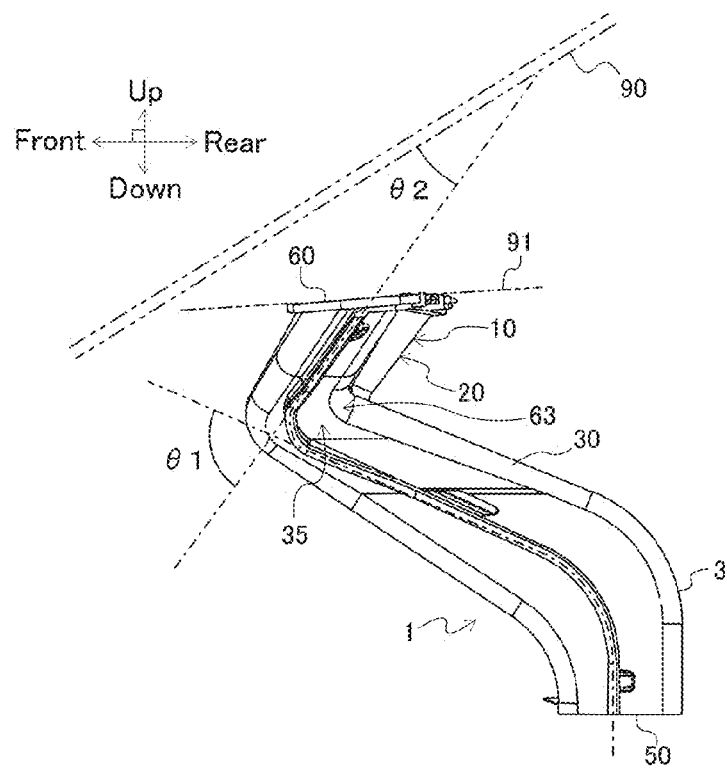
FIG. 3 is an explanatory diagram for schematically illustrating an appearance of the present front defroster nozzle apparatus according to Embodiment when it is put in place within a vehicular passenger room.
Figure 4:
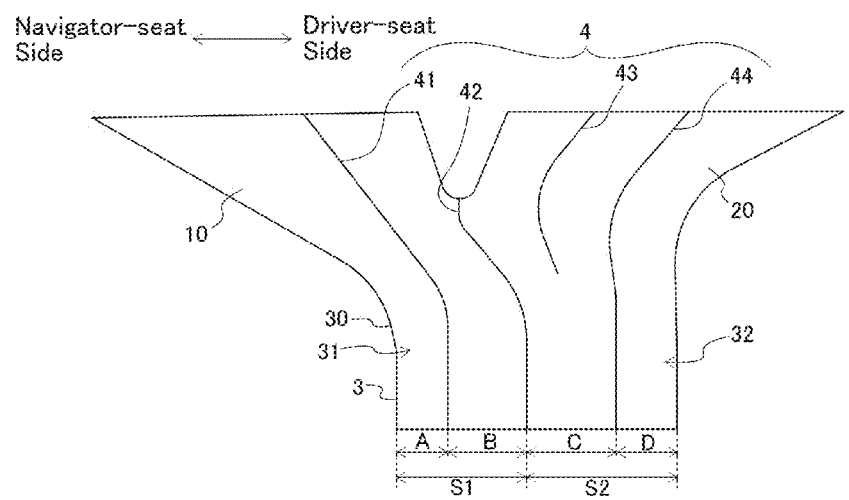
FIG. 4 is an explanatory diagram for schematically illustrating a structure of the present front defroster nozzle apparatus according to Embodiment.
Figure 5:
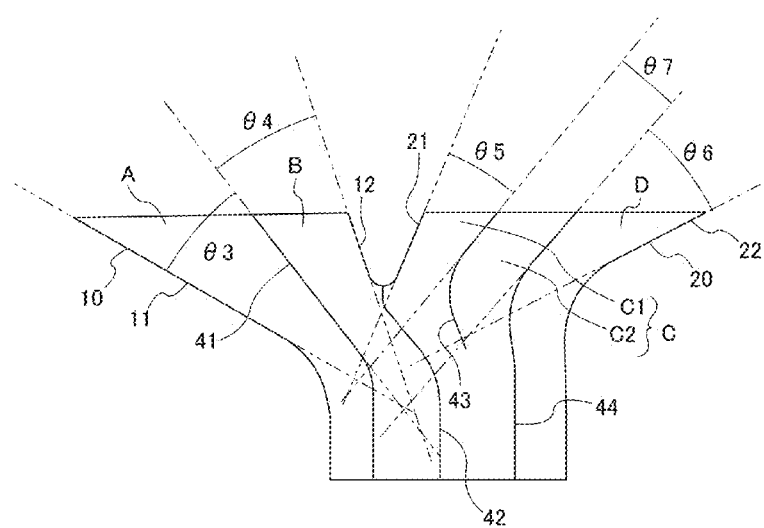
FIG. 5 is an explanatory diagram for illustrating flow passages for air-conditioning airs in the present front defroster nozzle apparatus according to Embodiment.
Figure 6:
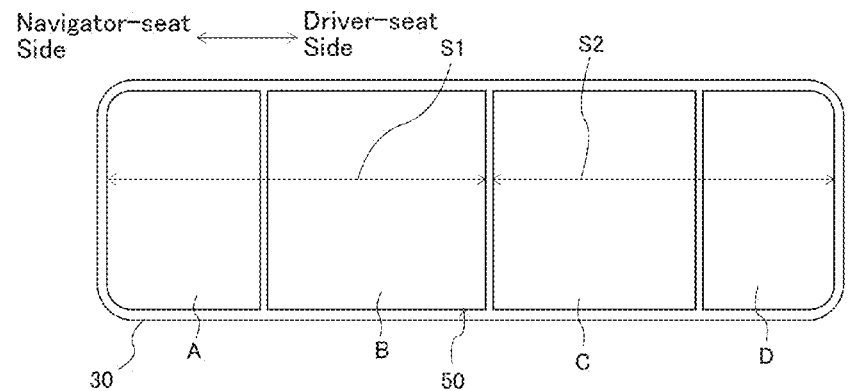
FIG. 6 is another explanatory diagram for illustrating the flow passages for air-conditioning airs in the present front defroster nozzle apparatus according to Embodiment.
Figure 7:
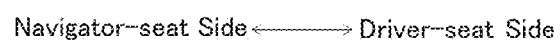
FIG. 7 is another explanatory diagram for schematically illustrating another appearance of the present front defroster nozzle apparatus according to Embodiment when it is put in place within the vehicular passenger room.
Figure 7:
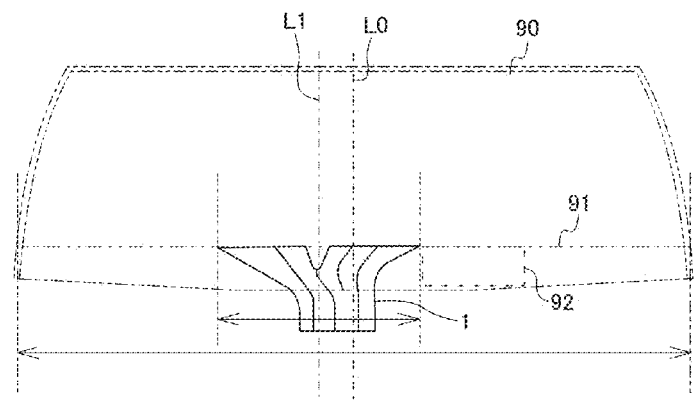
Figure 8:
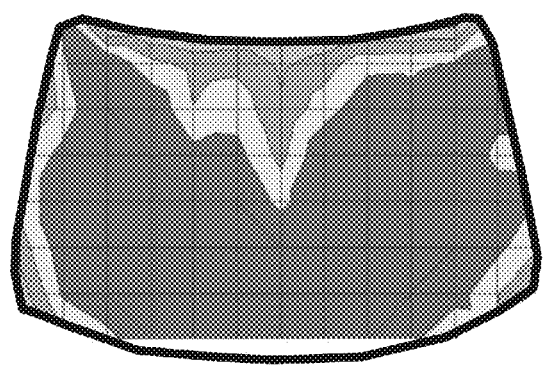
FIG. 8 is a diagram of the distribution of wind speeds on a windshield when air-conditioning airs were blown out from the present front defroster nozzle apparatus according to Embodiment.
Figure 9:
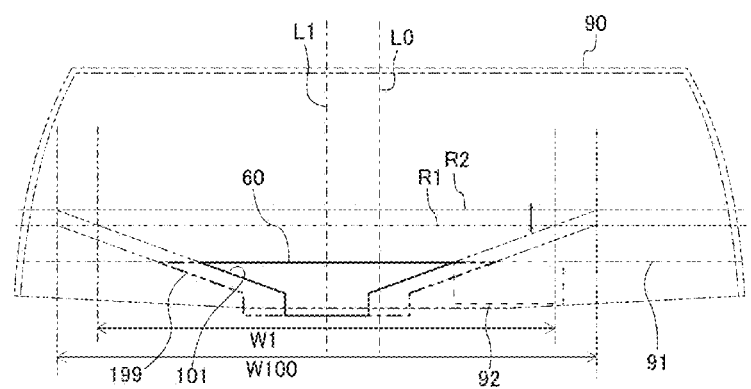
FIG. 9 is an explanatory diagram for illustrating relationships between two types of front defroster nozzle apparatuses having different outlet widths at the blow-out or outlet port, and regions in a windshield onto which the two front defroster nozzle apparatuses supplied air-conditioning airs.

A front defroster nozzle apparatus according to Embodiment is one of the forms of the front defroster apparatus according to the present invention. FIG. 1 is a perspective diagram for schematically illustrating how the front defroster nozzle apparatus according to Embodiment appears when it is viewed from the rear side and the navigator-seat side in a vehicular advancement direction. FIG. 2 is an exploded perspective view for illustrating how a rear retainer, one of the constituent elements of the front defroster nozzle apparatus according to Embodiment, appears when it is viewed from the leading end in a vehicular advancement direction. Note that the rear retainer is one of members that constitute part of a later-described retainer. FIG. 3 is an explanatory diagram for illustrating how the front defroster nozzle apparatus according to Embodiment, which is put in place within a vehicular passenger room, appears when it is viewed from the navigator-seat side. FIGS. 4 and 5 are explanatory diagrams that schematically illustrate how the front defroster nozzle apparatus according to Embodiment appears when it is viewed from the rear side in a vehicular advancement direction. Specifically, FIG. 4, one of the two explanatory diagrams, schematically illustrates a structure of the front defroster nozzle apparatus according to Embodiment, and FIG. 5, the other one of them, schematically illustrates flow passages for air-conditioning airs in the front defroster nozzle apparatus according to Embodiment. FIG. 6 is another explanatory diagram for illustrating the flow passages for air-conditioning airs in the front defroster nozzle apparatus according to Embodiment. FIG. 7 is still another explanatory diagram for schematically illustrating how the front defroster nozzle apparatus according to Embodiment appears when it is put in place within a vehicular passenger room. FIG. 8 is a distribution diagram of wind speeds on a windshield when air-conditioning airs are blown out from the front defroster nozzle apparatus according to Embodiment. FIG. 9 is an explanatory diagram for illustrating relationships between two front defroster nozzle apparatuses with opening widths differing one another, and regions in a windshield onto which the two front defroster nozzle apparatuses supplied air-conditioning airs. Hereinafter, the terms, "up," "down," "front," "rear," "driver-seat side" and "navigator-seat side," indicate the "up," "down," "front," "rear," "driver-seat side" and "navigator-seat side" shown in FIG. 1, respectively. Note that a "vehicular width (or blow-out-width) direction," an "outlet-width direction," a "flow-passage-width direction," and an "opening-width direction" coincide with each other, and all of the directions indicate the "navigator-seat side direction/driver-seat side" direction shown in FIG. 1, and so on. Moreover, an "upstream side of the air-conditioning air flow passages" indicates the downward side shown in FIG. 1, and a "downstream side of the air-conditioning air flow passages" indicates the upward side shown in the drawing. Hereinafter, the upstream side of the air-conditioning air flow passages might sometimes be simply referred to as an "upstream side," and the downstream side of the air-conditioning air flow passages might sometimes be simply referred to as a "downstream side," if needed.

As illustrated in FIGS. 1 and 2, a front defroster nozzle apparatus 1 according to Embodiment of the present invention comprises a retainer 3, and four guide fins 4. The retainer 3 has a substantially squared duct-like shape, and includes two separate constituent elements, a front retainer 3a and a rea retainer 3b. The front retainer 3a and rear retainer 3b are integrated one another into the retainer 3 by fitting. The front retainer 3a makes the leading-end part of the retainer 3 in a vehicular advancement direction. The rear retainer 3b makes the trailing-end part of the retainer 3 in the vehicular advancement direction.

The four guide fins 4 are put in place inside the retainer 3, and are integrated with the retainer 3. To be concrete, the guide fins 4 are molded integrally with the rear retainer 3b, as shown in FIG. 2. Moreover, the guide fins 4 are also integrated with the front retainer 3a when the rear retainer 3b and front retainer 3a are assembled with one another.

As illustrated in FIG. 1, the retainer 3 is branched into two forked elements at the downstream part. In the drawing, one of the two forked elements branched from the retainer 3 and locating on the navigator-seat side is referred to as a first branch 10, and the other one of them and locating on the driver-seat side is referred to as a second branch 20. Moreover, parts of the retainer 3 other than the first branch 10 and second branch 20, namely, parts of the retainer 3 being continuous from the upstream side of the first branch 10 and second branch 20 are collectively referred to as a retainer base 30. The retainer base 30 has a substantially squared duct-like shape, and includes flow passages for air-conditioning airs therein. The upstream-side end of the retainer base 30 makes an inlet opening 50 of the retainer 3, and is connected with a not-shown air-conditioning system. The first branch 10 and second branch 20 also have a duct-like shape respectively, and includes flow passages for air-conditioning airs therein. The upstream-side end of the first branch 10 is referred to as a first inlet end 51, and the upstream-side end of the second branch 20 is referred to as a second inlet end 52. The first inlet end 51 and second inlet end 52 are continuous from a downstream-side end 63 of the retainer 30, respectively.

As illustrated in FIG. 3, the retainer base 30 not only extends in the up/down direction, but also inclines in the front/rear direction. More specifically, the retainer base 30 is directed rearward and downward at the inlet opening 50, and is further directed forward and upward at the downstream-side end 63. The first branch 10 and second branch 20 are continuous from the downstream-side end 63 of the retainer base 30, namely, the upper-side and front-side end of the retainer base 30, and incline therefrom toward a more upper and rear side. That is, the first branch 10 and second branch 20 are continuous from the retainer base 30 with a predetermined front/rear crossing angle "$\theta_1$" thereto, respectively. In the front nozzle defroster apparatus 1 according to Embodiment, the front/rear crossing angle "$\theta_1$" is about 80 deg. As described later, the setting leads to making another front/rear crossing angle "$\theta_2$" an acute angle between a windshield 90 and the flow passages for air-conditioning airs flowing from out of a blow-out or outlet port 60 in order to blow the air-conditioning airs flowing from out of the outlet port 60 to the windshield 90 at its slightly upper parts. In the present specification, the term, a "front/rear crossing angle," will hereinafter designate one of the two crossing angles making a minor angle to the other one of them making a major angle. More specifically, the term, a "front/rear crossing angle," means a smaller angle (e.g., 0 deg.<("Front/Rear Crossing Angle)<180 deg.) that the windshield 90 and the first branch 10 and/or the second branch 20 make between them in the vehicular advancement direction.

As described above, the upstream-side end of the retainer base 30 makes the inlet opening 50, one of the openings in the retainer 3. Moreover, a first blow-out or outlet opening 61, and a second blow-out or outlet opening 62 make the outlet port 60, the other one of the openings in the retainer 3. In addition, the first outlet opening 61 is located on a navigator-seat side, and the second outlet opening 62 is located on a driver-seat side. Moreover, the downstream-side end of the first branch 10 makes the first outlet opening 61, and the downstream-side end of the second branch 20 makes the second outlet opening 62. In addition, the retainer base 30 has a substantially sector-like shape whose flow-passage width enlarges from small to large gradually from the upstream side to the downstream side. The first branch 10 and second branch 20 being continuous from the downstream-side end of the retainer base 30 are made similarly. That is, the first branch 10 and second branch 20 also have a flow-passage width that enlarges from small to large gradually from the upstream side to the downstream side, respectively. Therefore, a vehicle-width-direction length of the outlet port 60 involving those of the first branch 10 and second branch 20, namely, a blow-out or outlet width of the outlet port 60 is larger than a vehicle-width-direction opening width of the inlet opening 50. In the front defroster nozzle apparatus according to Embodiment, the outlet port 60 has a blow-out or outlet width of 400 mm. Note that, in the present specification, the term, a "blow-out or outlet width" of the outlet port 60 designates a vehicle-width-direction length from the navigator-seat-side end of the first branch 10 to the driver-seat-side end of the second branch 20.

As illustrated in FIGS. 1 and 3, the retainer base 30 includes a throttled portion 35 on the downstream side. The flow-passage cross-sectional area of the retainer base 30 minimizes at the throttled portion 35. As illustrated in FIG. 3, the thickness of the retainer base 30 minimizes at the throttled portion 35. Therefore, although the flow-passage width of the retainer base 30 enlarges from small to large from the upstream side to the downstream side, the flow-passage cross-sectional area of the retainer base 30 lessens from large to small from the upstream side to the downstream side to minimize at the throttled portion 35, as described above. In other words, the throttled portion 35 has a smaller flow-passage cross-sectional area than that of the inlet opening 50. More specifically, the flow-passage cross-sectional area of the throttled portion 35 is 70% by area when the flow-passage cross-sectional area of the inlet opening 50 is taken as 100% by area.

In the front defroster nozzle apparatus 1 according to Embodiment, the pressure of air-conditioning airs within the retainer 3 is enhanced once at the throttled portion 35, and is reduced sharply thereafter at the first branch 10 and second branch 20, because the flow-passage cross-sectional area of the throttled portion 35 is smaller than the flow-passage cross-sectional area of the inlet opening 50. That is, a force is applied to the air-conditioning airs in diffusing directions when they pass through the throttled portion 35. Therefore, disposing the throttled portion 35 in a flow passage of air-conditioning airs enables the air-conditioning airs to diffuse, and eventually makes it possible to supply the air-conditioning airs even up to the opposite ends of the windshield 90 that are separated greatly away from the front defroster nozzle apparatus 1. That is, the throttled portion 35 disposed in the front defroster nozzle apparatus 1 is one of the essential constituent elements for supplying the air-conditioning airs over the entire windshield 90 widely as much as possible (or without any non-supplied area).

In order to greatly diffuse air-conditioning airs flowing from out of the blow-out or outlet port 60, a proportion of the flow-passage cross-sectional area of the throttled portion 35 to the flow-passage cross-sectional area of the inlet opening 50 can preferably be as small as possible. In the meantime, such a problem might possibly arise as a pressure loss in the front defroster nozzle apparatus 1 according to Embodiment has become excessive when the flow-passage cross-sectional area of the throttled portion 35 is too small. Consequently, it is necessary that a proportion of the flow-passage cross-sectional area of the throttled portion 35 to the flow-passage cross-sectional area of the inlet opening 50 can fall within a predetermined range. To be concrete, the flow-passage cross-sectional area of the throttled portion 35 can more preferably fall in a range of from 80% by area or less to 60% by area or more when the flow-passage cross-sectional area of the inlet opening 50 is taken as 100% by area.

As illustrated in FIGS. 2 and 4, the front defroster nozzle apparatus 1 according to Embodiment comprises four guide fins 4. Each of the guide fins 4 extends from the downstream side toward the upstream side. Moreover, the guide fins 4 are arranged one after another from the navigator-seat side toward the driver-seat side in a vehicular width direction. The four guide fins 4 will be hereinafter labeled a first guide fin 41, a second guide fin 42, a third guide fin 43 and a fourth guide fin 44, respectively, in the order of from the navigator-seat side to the driver-seat side.

The first through fourth guide fins (41, 42, 43, 44) are disposed to extend also into the retainer base 30 as well. Moreover, the second guide fin 42 demarcates the retainer base 30 into two parts roughly. As illustrated in FIG. 4, one of the two regions in the retainer 30 makes a first flow passage 31 communicating with the first branch 10, and the other one of them makes a second flow passage 32 communicating with the second branch 20.

As illustrated in FIG. 4, the first guide fin 41 is elongated in a flow-passage length direction over the entire area beginning with the first flow passage 31 and reaching the first branch 10. The first guide fin 41 demarcates the first flow passage 31 and first branch 10 into two regions. One of the two regions that is placed on the navigator-seat side will be hereinafter labeled a region "A," and the other one of them that is placed on the driver-seat side, namely, on the middle side in a vehicular width direction, will be hereinafter labeled a region "B." Moreover, the third guide fin 43 extends from a downstream-side section or part in the second flow passage 32, and is thereby elongated in a flow-passage length direction over the entire area of the second branch 20. In addition, the fourth guide fin 44 is elongated in a flow-passage length direction over the entire area beginning with the second flow passage 32 and reaching the second branch 20. The fourth guide fin 44 demarcates the second flow passage 32 and second branch 20 into two regions. One of the two regions that is placed on the navigator-seat side, namely, on the middle side in a vehicular width direction, will be hereinafter labeled a region "C," and the other one of them that is placed on the driver-seat side will be hereinafter labeled a region "D." Note that the third guide fin 43 is put in place in the region "C."

FIG. 6 illustrates the outlet opening 50 of the retainer base 30 schematically. As illustrated in the drawing, the region "A" accounts for a smaller flow-passage cross-sectional area in the inlet opening 50 than does the region "B" therein. Moreover, the region "D" accounts for a smaller flow-passage cross-sectional area in the inlet opening 50 than does the region "C" therein. It is also possible to say that the sum of the flow-passage cross-sectional area of the region "A" in the inlet opening 50 and the flow-passage cross sectional area of the region "B" therein can be equal to a flow-passage cross-sectional area "S1" of the first flow passage 31. Moreover, it is also possible to say that the sum of the flow-passage cross-sectional area of the region "C" in the inlet opening 50 and the flow-passage cross sectional area of the region "D" therein can be equal to a flow-passage cross-sectional area "S2" of the second flow passage 32.

The flow-passage cross-sectional area "S1" of the first flow passage 31 in the inlet opening 50 and the flow-passage cross-sectional area "S2" of the second flow passage 32 therein have the following relationship: "S1"<"S2." Since the front defroster nozzle apparatus 1 according to Embodiment is put in place lopsidedly on the navigator-seat side, a distance between the second flow passage 32 and the driver-seat-side opposite end of the windshield 90 is longer than another distance between the first flow passage 31 and the navigator-seat-side opposite end of the windshield 90, as can be seen from FIG. 7. Moreover, the flow-passage cross-sectional area "S2" of the second flow passage 32, which is separated away from the navigator-seat side's vehicle-width-direction opposite end, is greater than the flow-passage cross-sectional area "S1" of the first flow passage 31, which is placed close to the navigator-seat side's vehicle-width-direction opposite end relatively, as can be seen from FIG. 4. The first flow passage 31 and second flow passage 32, which are thus set up to have the flow-passage cross sectional areas, enable air-conditioning airs to be distributed into the two flow passages in a well-balanced manner. Moreover, the first flow passage 31 and second flow passage 32 make it possible to supply the air-conditioning airs in an ample volume even up to the vehicle-width-direction opposite ends of the windshield 90 that are present away from the blow-out or outlet port 60.

Note that, in the front defroster nozzle apparatus according to Embodiment, a ratio, "S1":"S2," namely, (Flow-passage Cross-sectional Area of the First Flow Passage 31):(Flow-passage Cross-sectional Area of the Second Flow passage 32), is equivalent to another ratio, namely, (Distance from the Navigator-seat Side's Opposite End of the Windshield 90 to the Center Line "L1" of the Blow-out or Outlet Port 60); (Another Distance from the Driver-Seat Side's Opposite End of the Windshield 90 to the Center Line "L1" of the Outlet Port 60), as shown in FIG. 7. As described above, the thus set-up ratios make it possible to optimally balance the distribution of air-conditioning airs between the two flow passages, the first and second flow passages 31 and 32. Accordingly, even up to the driver-seat side's vehicle-width-direction opposite end of the windshield 90 that is present more away from the blow-out or outlet port 60 than is the navigator-seat side's vehicle-width-direction opposite end, the front defroster nozzle apparatus 1 can supply an ample volume of the air-conditioning airs.

Moreover, note that, when the four guide fins 4 are not elongated down to the inlet opening 50 of the retainer base 30, the above-described relationship, "S1"<"S2," can be satisfactorily adapted so as to make it applicable to the relationship between a flow-passage cross-sectional area "S1" of the first flow passage 31 and another flow-passage cross-sectional area "S2" of the second flow passage 32 at one of the opposite ends of the four guide fines 4 on the side of the inlet opening 50.

As illustrated in FIG. 5, the first branch 10 and second branch 20 include two side walls, respectively. One of the two side walls of the first branch 10 placed on the navigator-seat side will be hereinafter referred to as a first outer side wall 11, and the other one of them placed on the driver-seat side will be hereinafter referred to as a first inner side wall 12. Moreover, one of the two side walls of the second branch 20 placed on the navigator-seat side will be hereinafter referred to as a second inner side wall 21, and the other one of them placed on the driver-seat side will be hereinafter referred to as a second outer side wall 22. The first outer side wall 11 and first inner side wall 12 correspond to or read on the claimed "a pair of first side walls (or paired first side walls) according to the present invention. Moreover, the second inner side wall 21 and second outer side wall 22 correspond to or read on the claimed "a pair of second side walls (or paired second side walls) according to the present invention.

The first outer side wall 11, first guide fin 41 and first inner side wall 12 divide the first branch 10 into two regions. One of the two regions is the above-described region "A," and the other one of them is the above-described region "B." The first outer side wall 11 and first guide fin 41 demarcate the region "A," and the first guide fin 41 and first inner side wall 12 demarcate the region "B."

The second inner side wall 21, third guide fin 43, fourth guide fin 44 and second outer side wall 22 divide the second branch 20 into three regions. One of the three regions is the above-described region "D." The other two of them are regions "C1" and "C2" that make the downstream-side section or part of the above-described region "C." The second inner side wall 21 and third guide fin 43 demarcate the region "C1," the third guide fin 43 and fourth guide fin 44 demarcate the region "C2," and the fourth guide fin 44 and second outer side wall 22 demarcate the region "D."

Other than the region "C2" whose flow-passage width is constant substantially, all of the regions "A," "B," "C1" and "D" have a flow-passage width that enlarges gradually from small to large from the upstream side toward the downstream side, respectively.

Incidentally, such a case might possibly arise as sections or parts, where the air volume of air-conditioning airs becomes insufficient, occur at the vehicle-width-direction opposite ends of the windshield 90, as described above in the front defroster nozzle apparatus 101 according to Reference Embodiment. As a result of the present inventors' wholehearted studies, they found out that the phenomenon of air-volume insufficiency depends on how a flow-passage width widens. To be concrete, it is possible to inhibit the phenomenon of above-described air-volume insufficiency, when the flow pas sages do not widen excessively, namely, when all of the following crossing angles are 22.5 deg. or less: the crossing angle "$\theta_3$" between the first outer side wall 11 and the first guide fin 41; the crossing angle "$\theta_4$" between the first guide fin 41 and the first inner side wall 12; the crossing angle "$\theta_5$" between the second inner side wall 21 and the third guide fin 43; and the crossing angle "$\theta_6$" between the fourth guide fin 44 and the second outer side wall 22. That is, when the crossing angles "$\theta_3$" through "$\theta_6$" are large extremely, the so-called peel-off phenomenon, in which air-conditioning airs have decreased at the sections or parts of the flow-passages' opposite ends, is believed to occur, because flow rates of air-conditioning airs differ greatly between sections or parts at the flow-passage central side in the first and second flow passages (31, 32) and other sections or parts at the flow-passage opposite ends (namely, sections or parts adjacent to the guide fins (41, 42, 43, 44), first outer and inner side walls (11, 12) and second outer and inner side walls (21, 22)) therein. On the contrary, when the crossing angles "$\theta_3$" through "$\theta_6$" are 22.5 deg. or less, it is believed possible to inhibit the flow rates from fluctuating at each of the sections or parts in the first and second flow passages (31, 32). As a result, it is believed possible to inhibit the peel-off phenomenon of air-conditioning airs. Therefore, when the crossing angles "$\theta_3$" through "$\theta_6$" are 22.5 deg. or less, it is possible to supply air-conditioning airs more sufficiently even up to the driver-seat-side opposite end and navigator-seat-side opposite end of the windshield 90. Note that, since the third guide fin 43 and the fourth guide fin 44 are parallel to each other, the crossing angles "$\theta_7$" is 0 deg.

In the front defroster nozzle apparatus 1 according to Embodiment, a distance from the second outer side wall 22 to the driver-seat-side opposite end of the windshield 90 is longer than another distance from the first outer wall side wall 11 to the navigator-seat-side opposite end of the windshield 90. Consequently, an inclining angle of the second outer side wall 22 to the center line "L1" is made larger than another inclining angle of the first outer side wall 11 to the center line "L1," as can be seen from FIGS. 5 and 7. The thus configured first outer side wall 11 and second outer side wall 22 enable air-conditioning airs to be supplied efficiently even up to the opposite ends of the windshield 90 that are separated away from the front defroster nozzle apparatus 1.

A lower-limit value of the crossing angles "$\theta_3$" through "$\theta_6$" is not limited especially herein. However, from a viewpoint of using the front defroster nozzle apparatus according to Embodiment practically, it is believed satisfactory that the lower-limit value can be 0 deg. or more. Moreover, it is preferable that the crossing angles "$\theta_3$" through "$\theta_6$" can fall in a range of from 7.5 to 22.5 deg. It is more preferable that they can fall in a range of from 10 to 20 deg.

In addition, when a plurality of the guide fins 4 are put in place in any one of the first branch 10 and second branch 20, it is possible to specify that the crossing angles between the respective guide fins 4 (e.g., the above-described crossing angle "$\theta_7$" between the third guide fin 43 and the fourth guide fin 44 in the front defroster nozzle apparatus 1 according to Embodiment) can likewise be 22.5 deg. or less as well. Preferable ranges of the crossing angles "$\theta_7$" can also be the same as those of the above-described other crossing angles "$\theta_3$" through "$\theta_6$." Note that the third guide fin 43 and the fourth guide fin 44 are parallel to each other substantially in the front defroster nozzle apparatus 1. However, the third guide fin 43 disposed in the region "C" enables the distribution of wind speeds to be uniform substantially, because it further inhibits the peel-off phenomenon of air-conditioning airs.

When any one of the side walls (11, 12, 21, 22) and four guide fins (41, 42, 43, 44) is curved, it is satisfactory to set up the above-described crossing angles "$\theta_3$" through "$\theta_7$" based on a straight line that connects the upstream-side opposite end of the side walls (11, 12, 21, 22) and/or four guide fins (41, 42, 43, 44) with the downstream-side opposite end of them. For example, let us assume that the first outer side wall 11 is curved, an imaginary straight line is drawn first, imaginary straight line which connects the first outer side wall 11 present at the first inlet end 51 with the first outer side wall 11 present at the first blow-out or outlet opening 61 in a plane that is parallel to a flow passage of air-conditioning airs as well as to a vehicular width direction. Then, a crossing angle between the straight line and the first guide fin 41 can satisfactorily be made 22.5 deg. or less.

The above setup procedure is applicable similarly to the other side walls (12, 21, 22) and guide fins (42, 43, 44) when they are curved.

As illustrated in FIG. 7, the vehicle-width-direction center line "L1" of the front defroster nozzle apparatus 1 according to Embodiment is deviated to the navigator-seat side from the vehicle-width-direction center line "L0" of the windshield 90 so as to put the front defroster nozzle apparatus 1 in place lopsidedly with respect to the windshield 90 in order to provide the instrument panel 91 with the head-up display device 92 on the driver-seat side. When the front defroster nozzle apparatus 1 is thus put in place lopsidedly or offside, it might possibly be less likely to supply air-conditioning airs, which have been blown out from the blow-out or outlet port 60, to the windshield 90 over the entire area in the width direction. For example, as indicated with the chain double-dashed bold line shown in FIG. 9, it is possible for a conventional front defroster nozzle apparatus 199 whose outlet port 60 has a large blow-out or outlet width to supply air-conditioning airs over a wide region "W100" within the windshield 90. However, as indicated with the continuous line in the drawing, it is only possible for the front defroster nozzle apparatus 101 according to Reference Embodiment whose outlet port 60 has a small blow-out or outlet width to confindely supply air-conditioning airs to no more than a relatively narrow region "W1" in the windshield 90 when it is put in place at the same position as the conventional front defroster nozzle 199 has been put in place, and when it aims air-conditioning air to blow out at a region "R1" that is present at the same height as the conventional front defroster nozzle apparatus 199 has targeted air-conditioning airs to blow out.

However, it is possible even for the front defroster nozzle apparatus 101 according to Reference Embodiment, which is put in place as described above, to supply air-conditioning airs even up to the wide region "W100" as well by further extending a flow-passage length for air-conditioning airs. That is, when air conditioning airs flowing from out of the blow-out or outlet port 60 are blown to the region "R2" that is present slightly above the region "R1," it is possible to extend a flow-passage length for the air-conditioning airs, while leaving the front defroster nozzle apparatus 101 being placed at the same position as shown in FIG. 9. In order to thus blow air-conditioning airs blowing from out of the outlet port 60 to a slightly upper section or part in the windshield 90, a front/rear crossing angle "θ$_2$" can satisfactorily be made smaller as much as possible between the windshield 90 and a flow passage for the air-conditioning airs blowing from out of the outlet port 60, as shown in FIG. 3. To be concrete, in a cross section obtained by cutting the front defroster nozzle apparatus 1 with a plane that extends in the front/rear direction and in the up/down direction, the configuration and position of the front defroster nozzle apparatus 1 can satisfactorily be set up so as to make a front/rear crossing angle "θ$_2$" a desirable angle between the windshield 90 and the center line of the first branch 10 and/or the second branch 20. Although the front/rear crossing angle "θ$_2$" is 30 deg. in the front defroster nozzle apparatus 1 according to Embodiment, the identical advantageous effects are obtainable when the front/rear crossing angle "θ$_2$" falls within a range of from 20 to 40 deg. Moreover, the front/rear crossing angle "θ$_2$" can more preferably fall within a range of from 25 to 35 deg. In addition, in order to set up the front/rear crossing angle "θ$_2$" so as to fall within the ranges, it is preferable to dispose the first branch 10 and/or the second branch 20 in such a direction as they intersect with the retainer base 30.

The front defroster nozzle apparatus 1 according to Embodiment was subjected to an air-blasting test. The air-blasting test was carried out after fixing the front defroster nozzle apparatus 1 at a position shown in FIGS. 3 and 7 with respect to the windshield 90 and then installing not-shown air-speed sensors onto the windshield 90. FIG. 8 illustrates a distribution of air speeds that was produced in the air-blasting test. Regions shown with a dark gray color in FIG. 8 are regions in which the air speeds were great sufficiently, namely, regions where air volumes were great sufficiently. On the other hand, other regions shown with alight gray color and white color in the drawing are regions in which the air speeds were low relatively, namely, regions where air volumes became insufficient. As illustrated in FIG. 8, the regions where the air volumes were great existed substantially symmetrically at both of the navigator-seat-side opposite end and driver-seat-side opposite end of the windshield 90. That is, the front nozzle defroster apparatus 1 was found to be capable of supplying air-conditioning airs even up to the opposite ends of the windshield 90 in the vehicular width direction.

Thus, it is possible to state that the front defroster nozzle apparatus 1 according to Embodiment can produce defogging performance that is superior to the defogging performance that conventional front defroster nozzle apparatuses have been offering, even when the front defroster nozzle apparatus 1 has the blow-out or outlet port whose blow-out or outlet width has been reduced considerably as small as 400 mm or less.

Others

The present invention is not all limited to the specific embodiment modes described above and illustrated in the drawings alone. That is, the present invention is executable while altering the embodiment modes reasonably or suitably within ranges not deviating from the gist. For example, another front nozzle defroster apparatus according to the present invention can be disposed lopsidedly with respect to the center line of a windshield, and can comprise:

a cylindrical retainer including an inlet opening connected with an air-conditioning system, and a blow-out or outlet port opened under the windshield within a vehicular passenger room; and a guide fin disposed inside the retainer;

the retainer further including a retainer base involving the inlet opening, a first branch, and a second branch, the first and second branches being continuous from a downstream side of the retainer base, and branched from the retainer base into two forked elements;

the first branch including a first inlet end being continuous from the retainer base, and a first blow-out or outlet opening making a part of the outlet port;

the second branch including a second inlet end being continuous from the retainer base, and a second blow-out or outlet opening making another part of the outlet port;

the first branch and/or the second branch inclining at a front/rear crossing angle of from 20 to 40 deg. to the windshield.

Having now fully described the present invention, it will be apparent to one of ordinary skill in the art that many changes and modifications can be made thereto without departing from the spirit or scope of the present invention as set forth herein including the appended claims.

What is claimed is:

1. A front defroster nozzle apparatus comprising:
a retainer including an inlet opening, which is connectable with an air-conditioning system, and a blow-out or outlet port, which opens under a windshield within a vehicular passenger compartment; and
a plurality of guide fins located inside the retainer, wherein
the retainer further includes a retainer base involving the inlet opening, a first branch, and a second branch, and the first and second branches are continuous from a downstream side of the retainer base and are branched from the retainer base into two forked elements;
the first branch includes a first inlet end, which is continuous from the retainer base, and a first blow-out or outlet opening, which forms a part of the outlet port;
the second branch includes a second inlet end, which is continuous from the retainer base, and a second blow-out or outlet opening, which forms another part of the outlet port;
the outlet port involves the first and second outlet openings and has a blow-out or outlet width of 400 mm or less;
the blow-out or outlet width of the outlet port is larger than an opening width of the inlet opening;
the first outlet opening has a first opening width, which is larger than a first flow-passage width of the first inlet end;
the second outlet opening has a second opening width, which is larger than a second flow-passage width of the second inlet end;
the retainer base includes a throttled portion, and wherein a flow-passage cross-sectional area of the throttled portion is smaller than a flow-passage cross-sectional area the of the inlet opening;
the flow-passage cross-sectional area of the throttled portion is in a range from 80% or less to 60% or more of the flow-passage cross-sectional area of the inlet opening;
the guide fins include:
a central guide fin, which demarcates the retainer base into a first flow passage and a second flow passage, wherein the first flow passage communicates with the first branch and the second flow passage communicates with the second branch,
a first flow passage guide fin, which is elongated in a flow-passage length direction of the first flow passage beginning with the first flow passage and reaching with the first branch, wherein the first flow passage guide fin demarcates the first flow passage and the first branch into a region A and a region B, wherein the region B is on an inward side of region A in a vehicular width direction, and
a second flow passage guide fin, which is elongated in a flow-passage length direction beginning with the second flow passage and reaching the second branch, wherein the second flow passage guide fin demarcates the second flow passage and the second branch into a region C and a region D, wherein the region C is on an inward side of the region D in a vehicular width direction;
the region A accounts for a smaller flow-passage cross-sectional area in the inlet opening than the region B, and the region D accounts for a smaller flow-passage cross-sectional area in the inlet opening than the region C;
the windshield has first and second opposite ends in a vehicular width direction, and the outlet port is located closer to the first end of the windshield than the second end and directs the first branch toward the first end; and
the first flow passage has a first flow-passage cross-sectional area at the inlet opening, and the second flow passage has a second flow-passage cross-sectional area at the inlet opening, and wherein the second flow-passage cross-sectional area is larger than the first flow-passage cross-sectional area.

2. The front defroster nozzle apparatus according to claim 1, wherein a pair of first side walls, which form side walls of the first branch, and the first flow passage guide fin, which is adjacent to one of the first side walls in the interior of the first branch, exhibit a first crossing angle, and a pair of second side walls, which form side walls of the second branch, and the second flow passage guide fin, which is adjacent to one of the second side walls in the interior of the second branch, exhibit a second crossing angle, and wherein each of the first and second crossing angles is 22.5 deg. or less.

3. The front defroster nozzle apparatus according to claim 2, wherein adjacent ones of the first flow passage guide fin, the central guide fin, and the second flow passage guide fin exhibit a crossing angle that is 22.5 deg. or less, respectively.

4. The front defroster nozzle apparatus according to claim 2, wherein the first and second crossing angles fall in a range from 7.5 to 22.5 deg.

5. The front defroster nozzle apparatus according to claim 3, wherein the adjacent ones of the first flow passage guide fin, the central guide fin, and the second flow passage guide fin exhibit a crossing angle falling in a range from 7.5 to 22.5 deg., respectively.

* * * * *